United States Patent [19]

Joy

[11] 3,879,990
[45] Apr. 29, 1975

[54] TESTING DEVICE FOR STRETCHABLE FABRIC UNDER SIMULATED BODY STRESSES

[75] Inventor: Herman J. Joy, Latham, N.Y.

[73] Assignee: Cluett Peabody & Co., Inc., New York, N.Y.

[22] Filed: Nov. 27, 1973

[21] Appl. No.: 419,307

Related U.S. Application Data

[63] Continuation-in-part of Ser. No. 180,792, Sept. 15, 1971, abandoned, which is a continuation-in-part of Ser. No. 46,688, June 16, 1970, abandoned.

[52] U.S. Cl. .......................... 73/95; 73/159; 223/52; 223/61
[51] Int. Cl. ........................... G01b 5/30; G01n 3/08
[58] Field of Search ............ 73/95, 159; 223/52, 61, 223/63

[56] References Cited
UNITED STATES PATENTS

| | | | |
|---|---|---|---|
| 1,817,617 | 8/1931 | Gosch | 73/159 X |
| 2,187,914 | 1/1940 | Reitan | 73/159 X |
| 2,273,743 | 2/1942 | Weinstein | 223/63 |
| 2,669,866 | 2/1954 | Holmes | 73/159 X |
| 3,356,271 | 12/1967 | Sobel | 223/61 X |
| 3,400,576 | 9/1968 | Siciliano | 73/159 X |
| 3,444,728 | 5/1969 | Burns | 73/159 X |
| 3,471,068 | 10/1969 | Foreman | 73/159 X |

FOREIGN PATENTS OR APPLICATIONS

| | | | |
|---|---|---|---|
| 299,094 | 10/1928 | United Kingdom | 73/95 |
| 998,901 | 7/1965 | United Kingdom | 73/159 |

Primary Examiner—Richard C. Queisser
Assistant Examiner—Frederick Shoon

[57] ABSTRACT

An apparatus and related method for testing and recording distention characteristics of stretchable fabrics or garments under simulated body stresses and more particularly knitted T-shirts and briefs. A pair of fabric carrying members are moved by a variable force to simulate body stresses on the T-shirt or brief. Distention over the range of the variable force is recorded automatically.

35 Claims, 20 Drawing Figures

INVENTOR.
HERMAN J. JOY

3,879,990
SHEET 2 OF 11
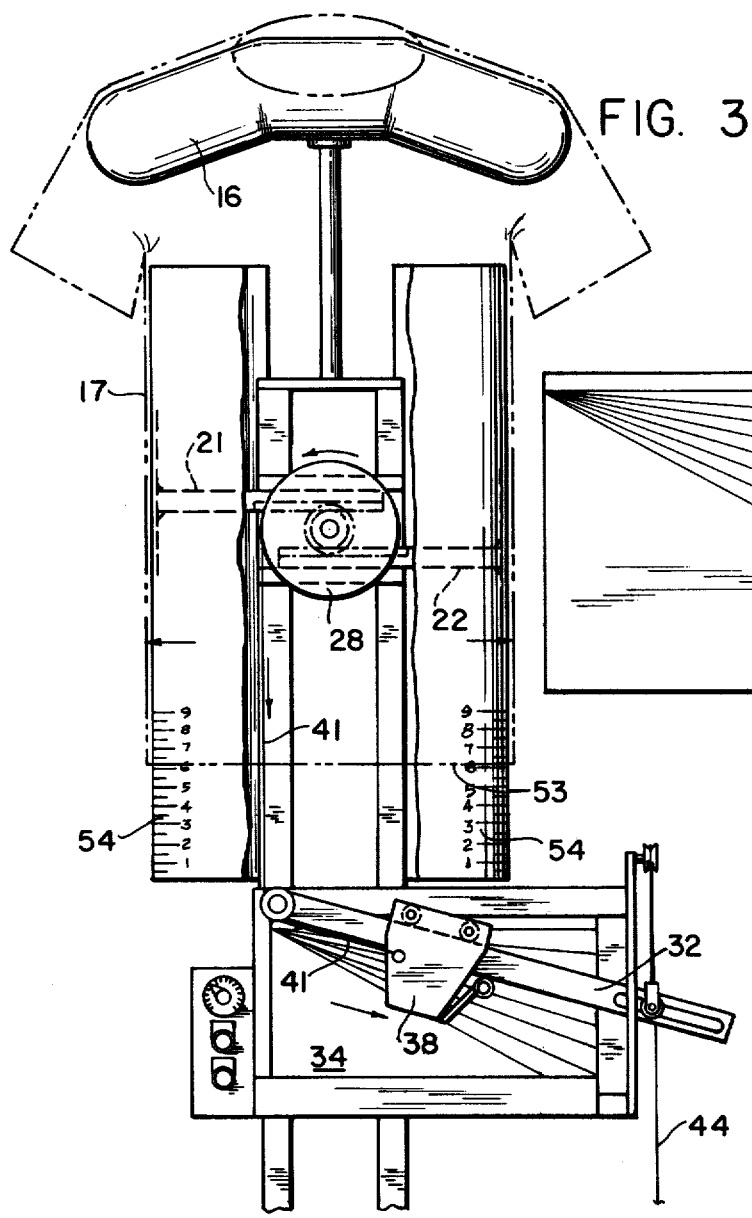
FIG. 3
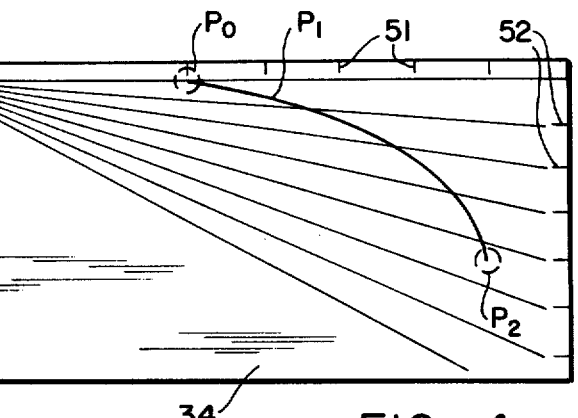
FIG. 4
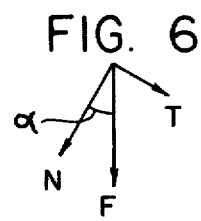
FIG. 6
FIG. 5
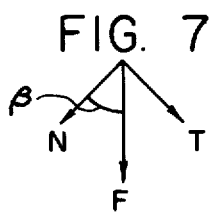
FIG. 7
*INVENTOR.*
HERMAN J. JOY
BY

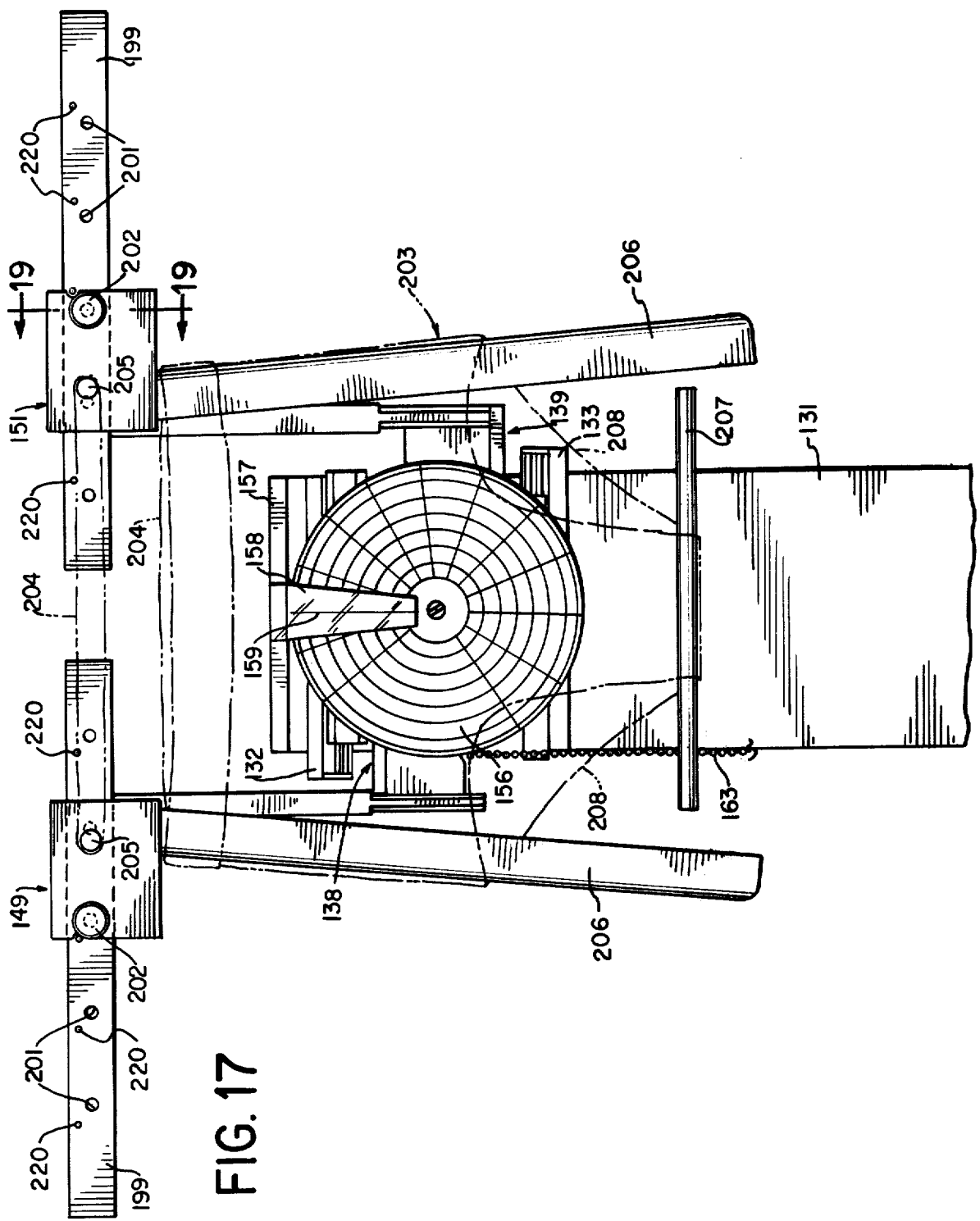

TESTING DEVICE FOR STRETCHABLE FABRIC UNDER SIMULATED BODY STRESSES

CROSS REFERENCE

This application is a continuation-in-part of U.S. patent application Ser. No. 180,792 filed Sept. 15, 1971 and now abandoned which in turn was a continuation then pending U.S. patent application Ser. No. 46,688 filed June 16, 1970 and now abandoned.

BACKGROUND OF THE INVENTION

The apparatus of the present invention seeks to provide a practical laboratory means for observing and recording automatically girthwise distension of T-shirts and/or briefs, other torso-encircling knitted garments, knitted tube fabrics and other stretchable woven or nonwoven garments. Test data obtained can be used as a performance control of finished products. Such performance control involves resiliency and shrinkage of the garment as affected by use and life as well as frequency and types of laundering. The present apparatus is also useful and important in evaluation of fabric preshrinking processes. This apparatus is useful further where random testing during production is required in order to maintain uniformity of product. Prior art apparatus for testing distention characteristics of garments include U.S. Pat. No. 1,817,617 to Gosch; U.S. Pat. No. 2,187,914 to Reitan; U.S. Pat. No. 2,699,866 to Holmes; U.S. Pat. No. 3,400,576 to Siciliano and the like.

SUMMARY OF THE INVENTION

This invention provides an apparatus which tests for stretch of a knitted garment or tube or the like, stretch being indicated by the force required to produce a measured distention. In order to accomplish this objective in a unique manner, a variable force is applied to distend a fabric or garment and a graphical record of such variable force is made in both horizontal and vertical directions, the resulting curve being used to evaluate the distention characteristics of the fabric or garment throughout a range of movement. More particularly, as will be seen with respect to various embodiments of the invention, means are provided for distending say, a tubular knit garment by members which move relatively apart within the garment in response to a variable force applied to said members. The force is supplied by connecting the mechanism for movement of said members to a weight which is free to ride down upon a beam as the beam declines from an initial horizontal position to an inclined position. Thus as the beam declines from the horizontal, the effect of the weight increases to cause a variably increasing distending force, while at the same time the weight travels horizontally out along the beam. By mounting a scribe on the weight adjacent to a chart, the path of the weight in both the X and Y directions can be charted and this record can be used to evaluate the relative resistance to distending movement (simulated body movement) throughout a range of such movement.

In accordance with further features of the invention, the members for internally distending a garment are readily interchangeable to accommodate different sizes of garments. Means are provided for adjusting the initial position of the distending members for a particular type and size of garment, including a rotating dial having indicia thereon which in combination with an adjustable length linkage between the distending members and the aforesaid weight, permit the precise positioning of the weight and members for each size garment tested.

Immediately prior to a test cycle, the apparatus of the invention provides for an exercise cycle which will condition each garment as a preliminary to testing. Vibrator means connected in the linkage between distending members and the weight assure that friction in the mechanism for distension is overcome, thus resulting in a smoother recorded curve upon movement of the weight.

Furthermore, the present apparatus provides great flexibility since the weight for applying the distending force may be changed and the rate of acceleration of the weight upon the beam can be controlled, all to permit the testing of a wide variety of garments under various simulated conditions of body movement.

With these and other objects, the nature of which should become apparent, the invention will be understood more fully by reference to the drawings, the accompanying detailed description and the appended claims.

BRIEF DESCRIPTION OF THE DRAWINGS

FIG. 3 is a partial view similar to FIG. 1 of the device of the invention in an alternate position of operation;

FIG. 4 is an enlarged view of a recording chart;

FIG. 5 is an enlarged view of an alternate recording chart for clarifying effects of variables inherent in operation of this device;

FIGS. 6 and 7 are diagrams depicting forces involved in the operation of this device;

FIG. 17 is a frontal elevational view depicting an alternate set of fabric distending members attachable to the frame adapted for testing briefs;

DESCRIPTION OF PREFERRED EMBODIMENTS

Figures 1, 2:
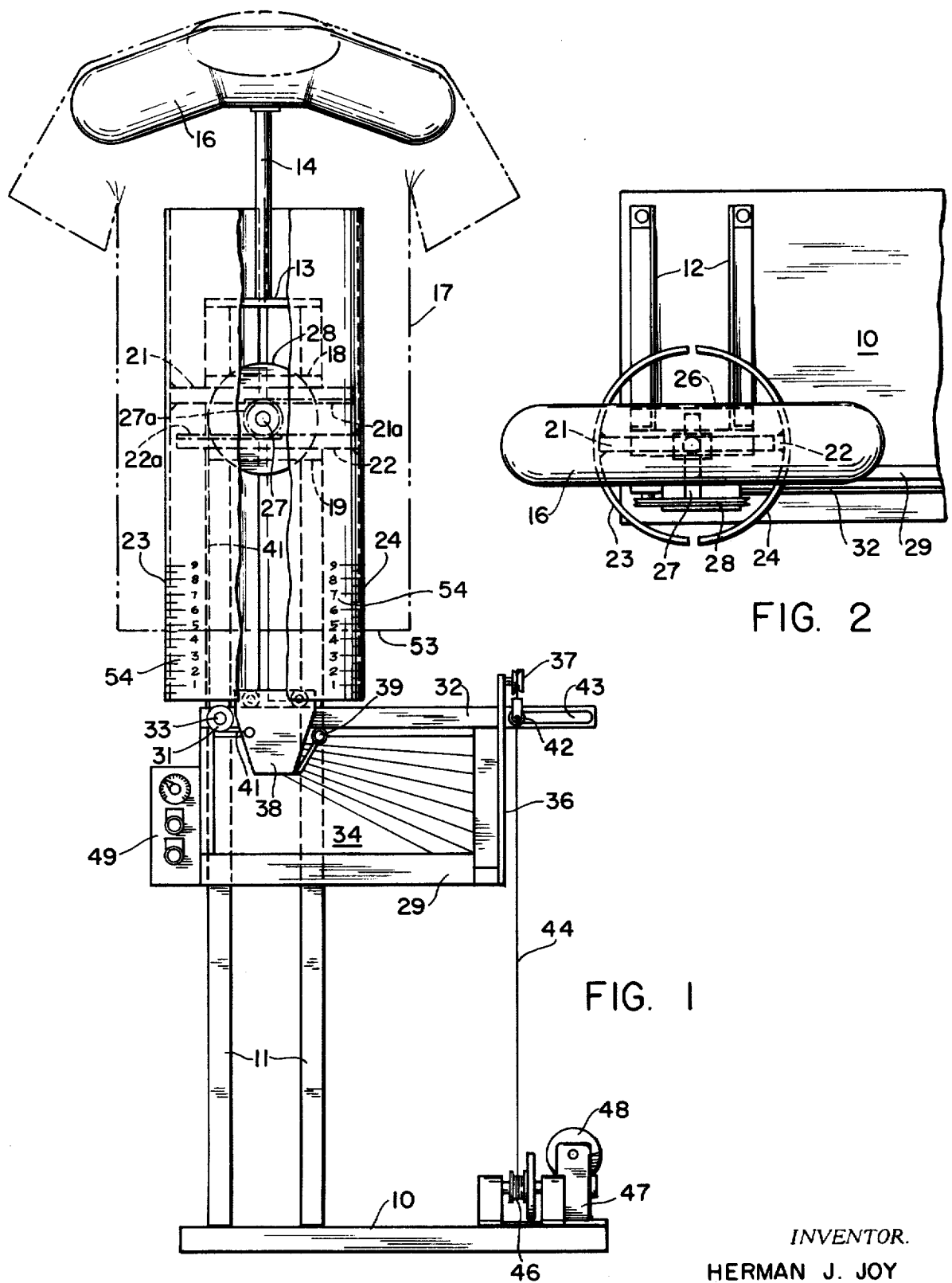
FIG. 1 is an elevation view of a testing device according to the present invention.
FIG. 2 is a top view of the device of FIG. 1.

As best seen in FIG. 1, base 10 mounts a pair of vertical angles 11 rigidized by a pair of rear-mounted angle braces 12 (best seen in FIG. 2). At the tops of angles 11, on cross brace 13, post 14 mounts yoke-shaped shoulder form 16 over which may be draped a knitted T-shirt 17 or a knitted tube or similar fabric item. A pair of cross braces 18 and 19, which span between angles 11, are adapted to receive a pair of cross rods 21 and 22 in slidably retained fashion. Cross rod 21 carries member 23 which is provided with a convex surface to simulate one half of the torso of a wearer. Cross rod 22 carries member 24 with convex surface similar and complimentary to convex surface 23 so that members 23 and 24 coact to simulate torso action of the wearer of the T-shirt.

Members 23 and 24 are directed toward and away from each other by rack and pinion action. Cross brace 26, spanning between angles 11 (as best seen in FIG. 2) spindles shaft 27 which carries sheave 28. Cross rods 21 and 22 have affixed thereto respectively racks 21$a$ and 22$a$, while shaft 27 has pinion 27$a$ which is adapted to engage said racks. Frame 29 positioned downward on angles 11 from sheave 28 mounts pulley 31 and weight-riding beam 32 pivoted on shaft 33 concentric with pulley 31. Frame 29 is provided further with chart 34 and slotted guide 36 defining the vertical path of beam 32. At the upper end of frame 29 is provided fixed pulley 37.

Traversing of members 23 and 24 is effected by movement of weight 38 down beam 32. Weight 38 is adapted to roll down beam 32 and has attached to it a scriber 39 maintained in contact with chart 34. Cable 41, attached to weight 38, passes around pulley 31, up to and around sheave 28 and is attached thereto. Inspection shows that the moment developed by weight 38 about the center of pulley 31 will, (unless opposed) cause members 23 and 24 to move outwardly. Control means include pulley 42 rolling in slot 43 formed in beam 32, and motion of beam 32 is confined to a vertical plane by guide 36. Pulley 42 is connected by cable 44 passing around pulley 37 to winch 46, driven through a speed reducer 47 by motor 48. A panel is provided by means well known in the art to control power, speed and direction of motor 48. On movement of weight 38 down beam 32, scriber 39 draws a curve on chart 34. It should be noted that the force on cable 41 is variable, even though the weight 38 is constant. As an aid to reading the curves on chart 34, horizontal calibrations 51 and vertical calibrations 52 are added.

As seen in FIG. 3, the hem line 53 of T-shirt 17 can be read on scales 54.

Accordingly, this testing device is operated by winching out cable 44, causing beam 32 to rotate downwardly about shaft 33 so that weight 38 rides down beam 32 pulling cable 41 to rotate sheave 28 and pinion 27$a$ thereby moving cross rods 21 and 22 outward to move concave members 23 and 24 simulating the action of a wearer's torso during breathing or other expanding activities. During this operation scriber 39 traces movement of weight 38 on chart 34 to provide a measure of yield of T-shirt 17 under simulated use conditions. More particularly, weight 38 would start at zero position $P_0$ (as best seen in FIG. 4) as motor 48 is started in its unwind direction. As beam 32 rotates clockwise through a small angle, weight 38 overcomes static friction and rolls rapidly to point $P_1$ determined by the traversing of members 23 and 24 up to their engagement of T-shirt 17. Therefore, the curve between $P_0$ and $P_1$ is substantially straight. Pull on cable 41 increases as beam 32 declines. As indicated by an analysis of the forces shown in FIG. 6, wherein F represents the constant gravitational force of weight 32, N the bearing force of weight 38 on beam 32 and T the tension acting on cable 41, this tension varies as the Sine of the angle of declination of beam 32 which is shown as $a$ in FIG. 6 wherein the rotation of beam 32 is small and $b$ in FIG. 7 wherein the declination of beam 32 is substantially larger. Therefore from point $P_1$ to the final point $P_2$ where garment elastic strength equals the force component T, the curve should not be straight. The shape of the curve and the position $P_2$ depend on the following:

1. magnitude of weight 38;
2. speed of motor 48;
3. garment size; and
4. elasticity of garment (change of distention as the garment is loaded).

Accordingly point $P_2$ serves as an important index for any test runs where weight 38, rate of speed of motor 48 and size of the garment are constant. The shape of the curve between points $P_1$ and $P_2$ is of value in analyzing changes of elasticity in a T-shirt (the "breathing capacity" of the knitted structure, so to speak).

Referring to FIG. 5, magnitudes of stretch $R_1$, $R_2$ and $R_3$, as well as angles of declination of beam 32 lend themselves to analysis by polar coordinates. Also as seen in FIG. 5, for a T-shirt with relatively little breathing capacity, the curve will tend to be steep such as C2; whereas for a T-shirt with more breathing capacity, the curve will tend to be more flat such as C1. As will be appreciated by those familar with the art, this testing device will also be useful in conducting repeated stretch tests, whereby nests, progressions and/or patterns of curves can provide a measurement of fatigue of fabric under test. Repeated tests can also be conducted in conjunction with a program of repeated washings and dryings.

Figure 8:
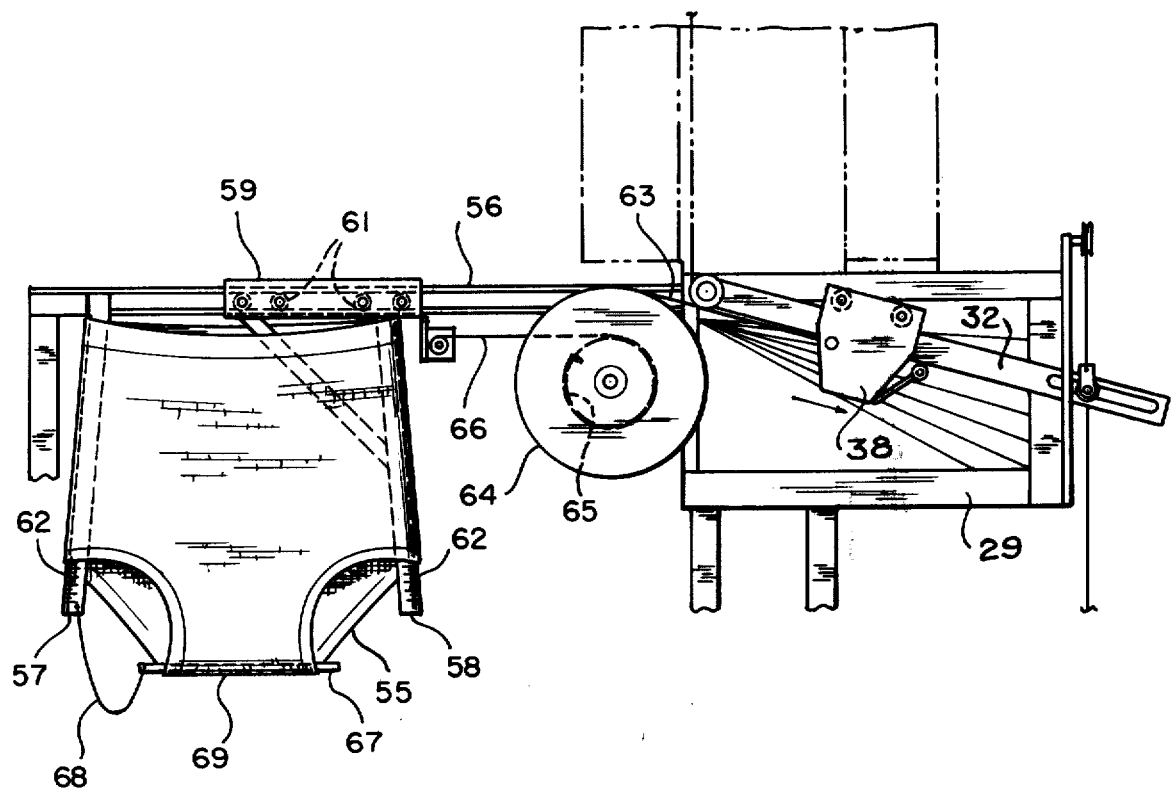
FIG. 8 is an enlarged broken elevation view of the testing device with an auxiliary attachment for testing briefs.

As seen in FIG. 8, an auxiliary attachment may be provided for testing knitted briefs 55. The auxiliary attachment includes horizontal bar 56 which is connected to frame 29 and has round outboard member 57 fixedly connected thereto and round inboard member 58 connected thereto by means of carriage 59 which is provided with rollers 61 to ride on horizontal bar 56. Outboard member 57 and inboard member 58 are provided with scales 62 to measure length of knitted brief 55. Testing of brief 55 is accomplished by movement of inboard member 58 away from outboard member 57 with the knitted brief distended about both of said members. Force is applied from weight 38 traveling down weight-riding beam 32 in the manner previously described. Weight 38 is connected to inboard member 58 by means of first cable 63 which is connected about large sheave 64 to the small sheave 65 for conjoined rotation therewith. Small sheave 65 in turn carries second cable 66. Rod 67 is connected by means of chain 68 to outboard member 57 and is positionable in the crotch 69 of brief 55 to put a little strain on the brief in a lengthwise direction so as to remove surface wrinkles and/or distortions therefrom.

Figure 9:
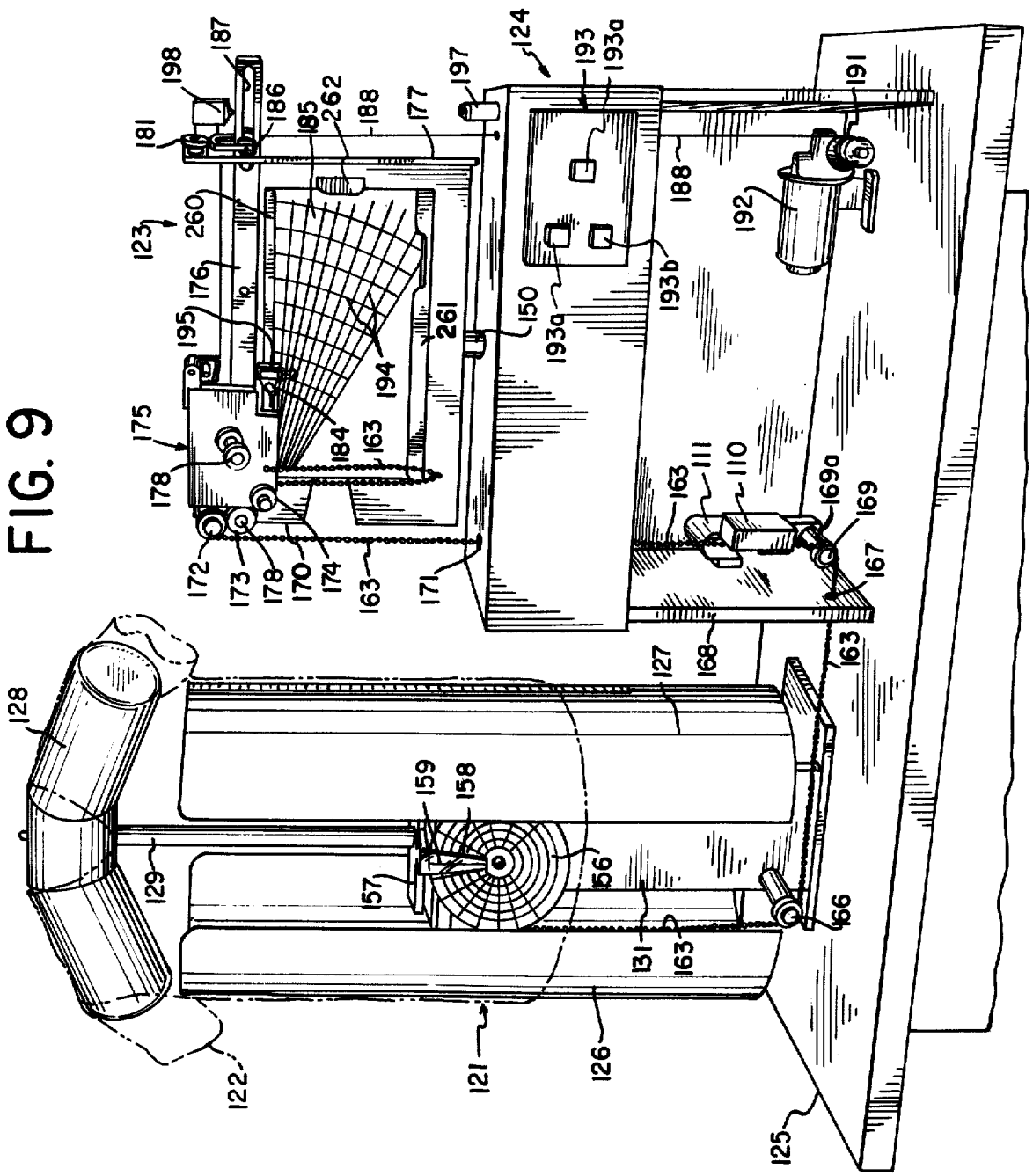
FIG. 9 is a frontal perspective view of an apparatus according to this invention having certain improvements incorporated therein with respect to the apparatus of FIGS. 1–8 set up for testing a T-shirt.

As best shown in FIG. 9 an apparatus suitable for testing and recording distention characteristics (here set up for a T-shirt) includes generally a mounting portion 121 for a fabric article (the T-shirt 122) as well as a stressing/recording portion 123 with a related console 124 all mounted for convenient access and operation on a table 125.

Figure 10:
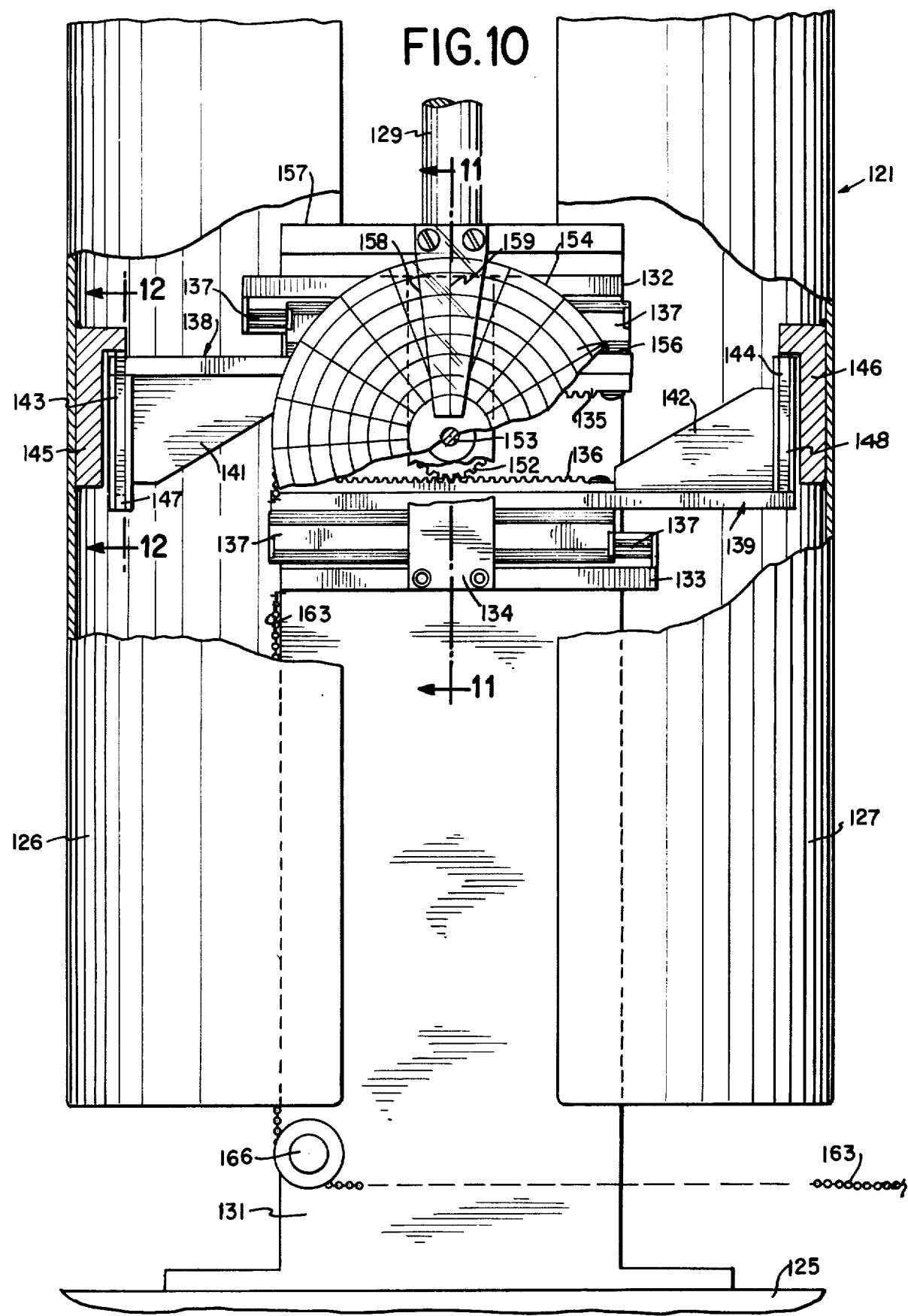
FIG. 10 is a frontal elevational view of fabric article carrying means of the apparatus of FIG. 9 partly broken away to show details of fabric carrying members and means for moving the fabric carrying members apart.
Figure 11:
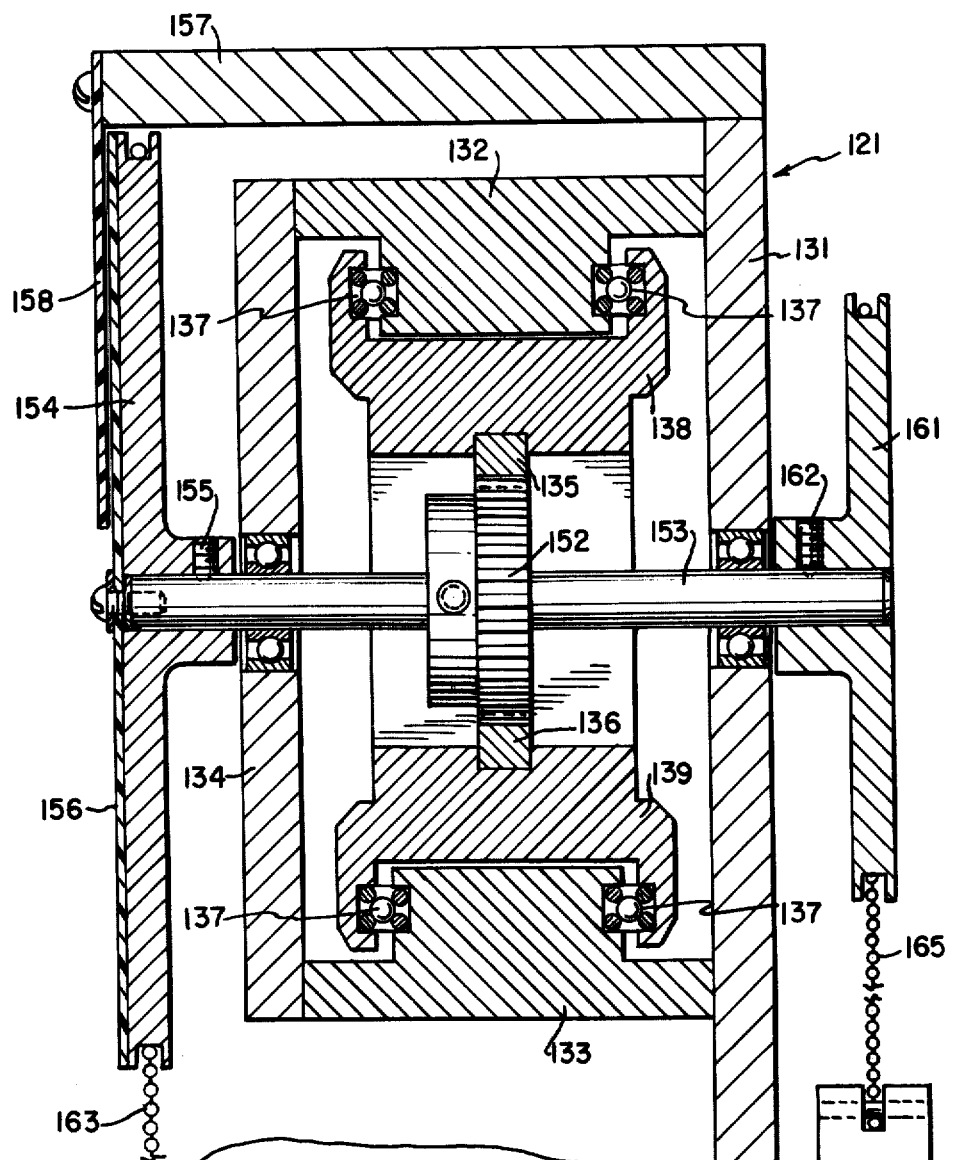
FIG. 11 is a partly broken vertical sectional view taken along line 11—11 of FIG. 10 and showing details of a rack and pinion arrangement which comprises an embodiment of the moving means.
Figure 12:
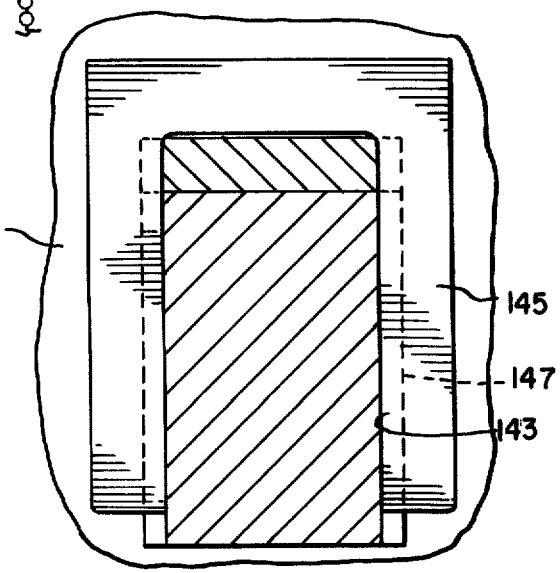
FIG. 12 is a broken sectional view taken along line 12—12 of FIG. 10 and showing tongue in groove mountings for positioning fabric distending means (either for T-shirts or briefs or other fabric articles) on the moving means.

The mounting portion 121 for a fabric article includes shell members 126, 127 which are provided with convex outward sides organized to bias a torso portion of a T-shirt 122 which is draped from a yoke 128. The yoke 128 is supported by a post 129 mounted from a framing plate 131 which in turn is connected rigidly to the table 125. As best shown in FIGS. 10 and 11, framing members 132, 133 and 134 are also connected rigidly to the framing plate 131. Racks 135, 136 are mounted in face to face relationship to move along the framing members 132, 133 respectively by means of ball slide bearings 137. Cross members 138, 139 are connected rigidly to the racks 135, 136 respectively so as to carry to shell members 126, 127 respectively laterally into biasing engagement with a torso portion of the T-shirt 122. As best shown in FIGS. 10 and 12, each of the cross members 138, 139 is provided respectively with a rigid bracket 141, 142, each having grooves 143, 144 respectively formed thereon. The shell members 126, 127 respectively have brackets 145, 146 with tongues 147, 148 formed thereon and organized respectively to engage the grooves 143, 144 in mating relationship for supporting the shell members 126, 127 in their operative positions shown in FIGS. 9 and 10. As will be set forth herein, other fabric article carrying members can likewise be fitted onto the brackets 141, 142, such as attachments 149, 151 for briefs shown in FIG. 17.

The cross members 138, 139 (shown in FIGS. 10 and 11) are biased toward and away from each other essentially by rack and pinion action. The cross members 138, 139 are each connected rigidly to the racks 135, 136 respectively. The racks 135, 136 both engage a pinion 152 connected fixedly to a shaft 153 journaled in the framing member 134 and the framing plate 131 (see FIG. 11). At its front end the shaft 153 carried a front sheave 154 mounted rigidly on the shaft 153 by means of a set screw 155. The front sheave 154 has a dial member 156 connected for conjoined rotation therewith and color coded as well as calibrated for correct positioning of various sizes and forms of the distending members 126, 127 for fabric articles of different sizes and shapes as will be described. For this purpose a framing member 157 mounts a transparent tab 158 with a hair line 159 thereon. At its rear end the shaft 153 carries a sheave 161 connected rigidly to the shaft by means of a set screw 162. The front sheave 154 has a front chain 163 connected thereto for driving the pinion 152 in accordance with a variable simulated body force to be described further herein. The sheave 161 has a counterweight 164 attached thereto by means of a chain 165 which functions to return the distending members to a starting position.

The variable simulated body force is provided from the mounting portion 121 to the stressing/recording portion 123 of the apparatus as follows: A chain 163 passes from the front sheave 154 around a pulley 166, through an opening 167 in a housing 168, around another pulley 169, through another opening 171 in the housing 168, around take-up pulleys 172, 173, through a chain clamp 174 and is connected to a weight 175 which is arranged upon rollers to ride down an inclinable beam 176. The beam 176 is pivotable about the pulley shaft 178 of pulley 173 and is guided within the framing member 177.

Figure 13:
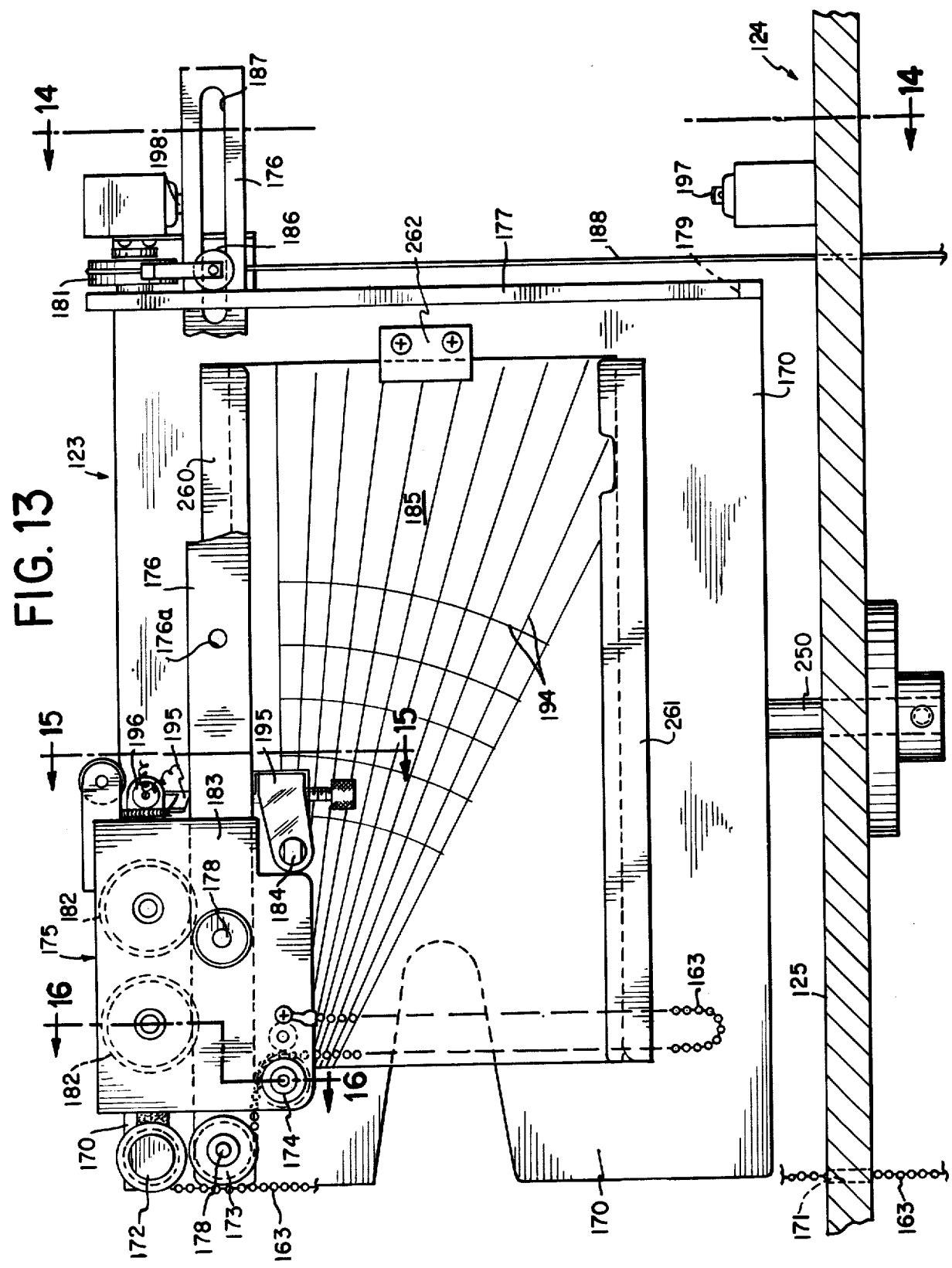
FIG. 13 is a partly broken view of stressing/recording means including a weight that slides down a beam under the force of gravity and having a scribe attached thereto for recordal of its path on a chart.
Figure 14:
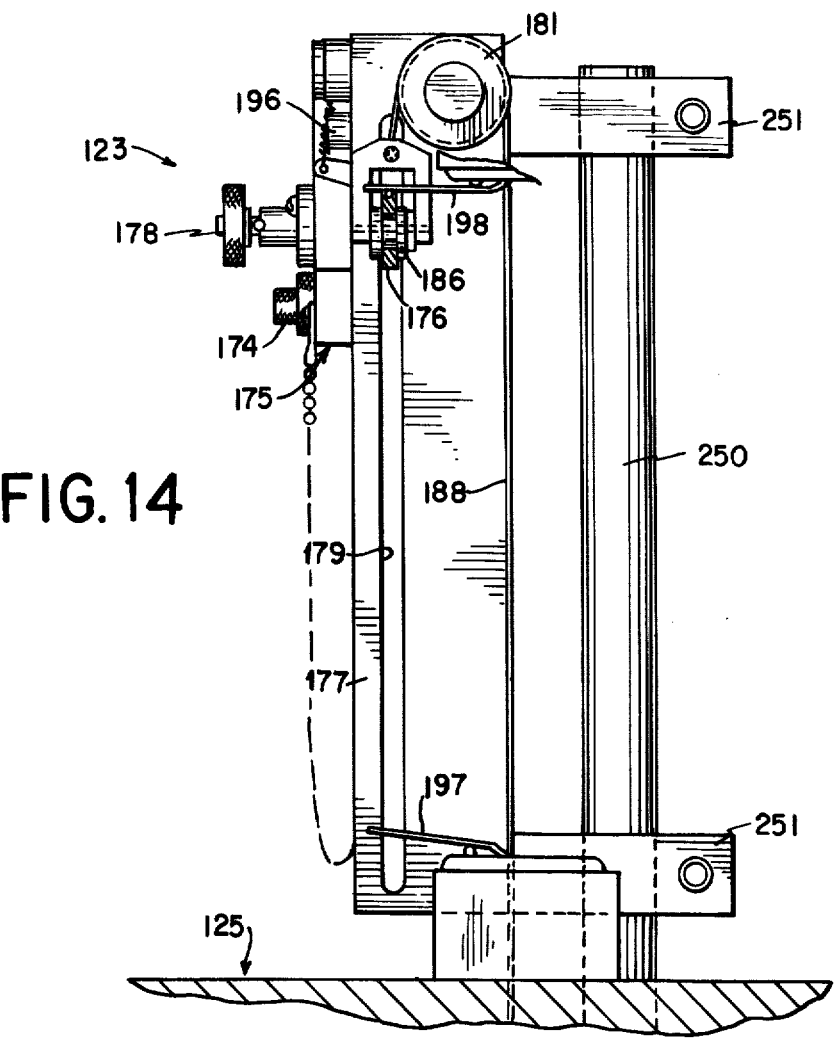
FIG. 14 is a sectional elevational view taken along line 14—14 of FIG. 13.

The stressing/recording portion 123 comprises a main frame plate 170 supported by a shaft 250 and brackets 251. Shaft 250 is journaled to table 125 as shown in FIG. 13. Framing member 177 is fixed at right angles to main frame plate 170. Take up pulleys 172 and 173 are also mounted on main frame plate 170. It will be seen from FIGS. 9 and 13 that a chart 185 is positioned against the front surface of main frame plate 170. Upper and lower tracks 260, 261 as well as stop member 262 accurately position the chart relative to arm 176 and weight 175.

The beam 176 is pivotable about the pulley shaft 178 of pulleys 173 and is guided within the framing member 177. The framing member 177 has a slotted guide 179 which defines a vertical path of inclination for the beam 176. At its upper end the framing member 177 is provided with a fixed pulley 181.

Figure 16:
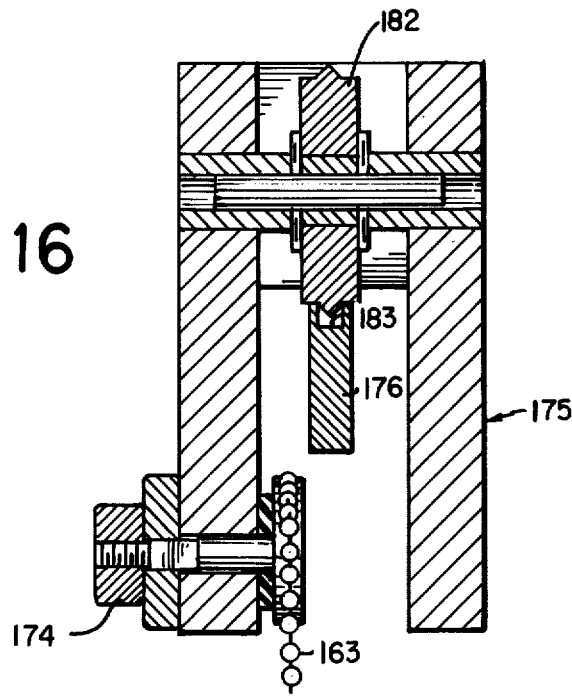
FIG. 16 is a sectional elevational view taken along line 16—16 of FIG. 13 and showing the mechanism for travel on the beam.

Traversing of the shell members 126, 127 to bias the torso portion of the T-shirt 122 is effected by a force developed from movement of the weight 175 down the beam 176. The force produced thusly has been found closely to simulate body distending stresses imposed on garments by wearers. The weight 175 has rollers 182 which ride in a groove 183 formed in the beam 176 as best shown in FIGS. 13 and 16. The weight 175 has attached to it a scriber 184 which, when in contact with a chart 185 traces a path of travel of the scriber thereon. Inspection of FIGS. 9 and 10 shows that the turning moment developed by movement of the weight 175 down the beam 176 causes the shell members 126, 127 to move apart. In order to control travel of the weight 175 down the beam 176, there is provided a pulley 186 connected to the beam 176 and movable laterally in a slot 187 (formed in the beam 176) while the beam 176 is confined to movement in a vertical path by the slotted guide 179 formed in the framing member 177. The pulley 186 on the beam 176 is connected by a cable 188 over the pulley 181 on the framing member 177 to a winch 191 driven by a motor 192.

A panel 193 having control buttons 193a–193c is provided to control the initiation of exercise and test cycles of the apparatus of the invention as will now be described. Button 193a when depressed will permit power on. Button 193b will energize motor 192 to cause cable 88 to payout to effect lowering of beam 176 by having weight 175 ride therealong until the end of the beam 176 contacts microswitch 197. Motor 192 is then reversed by action of microswitch 197 to draw in cable 188 to raise beam 176 until it contacts microswitch 198 which effects deenergization of the motor. By this movement members 126 and 127 are forced fully apart to distend a garment thereupon to prescribed limits. This preconditions the garment for subsequent testing. When a test cycle is to be run, button 193c will first be depressed to bring scriber 184 into contact with chart 185 by operation of solenoid 196. Then button 193b is depressed to energize motor 192. On movement of the weight 175 on the beam 176, the scriber 184 (when in contact with the chart 185) draws a curve on the chart 185 (see explanation of forces, embodiment FIGS. 1–7).

Figure 20:
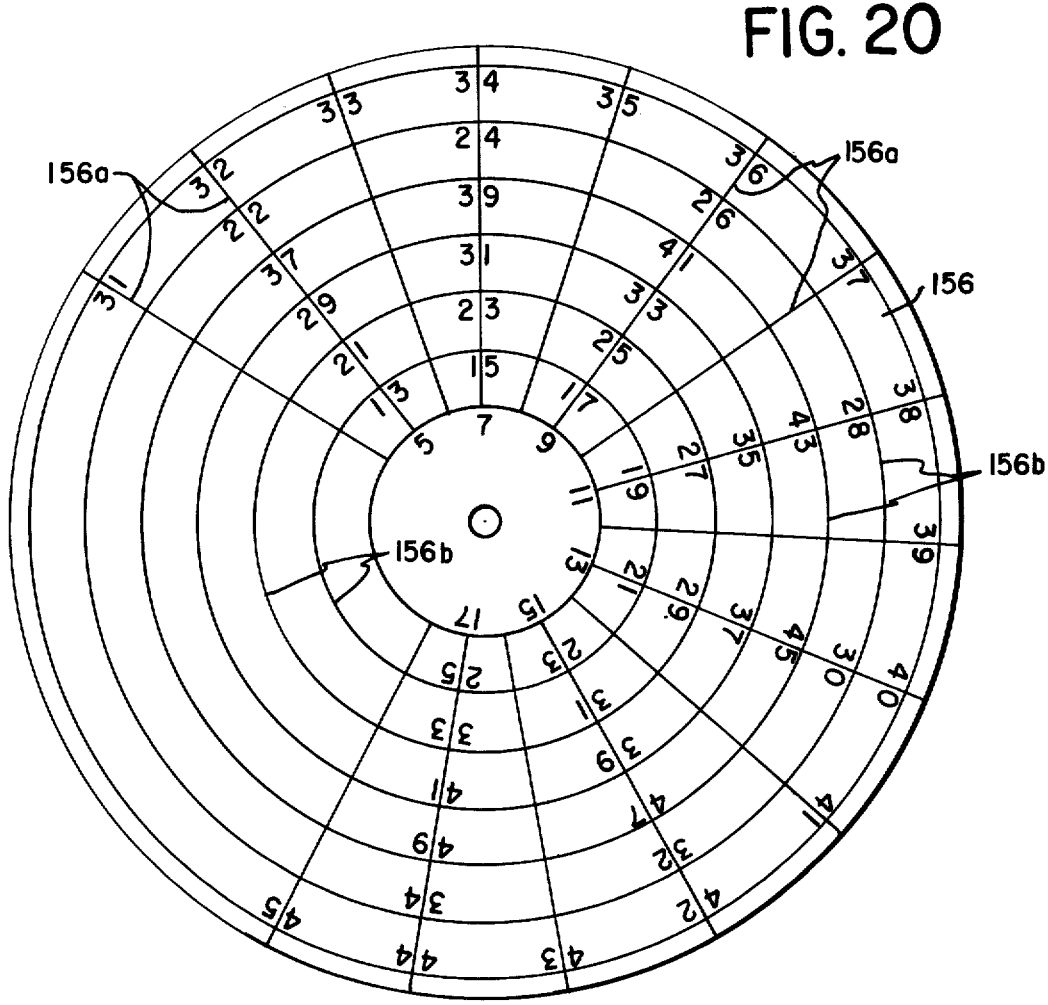
FIG. 20 is an enlarged detail of a dial for calibrating the position of the distending members for various garments and garments sizes.

With reference to FIG. 20, it will be seen that the dial 156 had indiciaa in the form of radial lines 156a and in the form of concentric lines 156b. At intersections of each radial line 156a and each concentric line 156b numbers corresponding to a specific garment size or other garment dimension are positioned. For example, the number 36 appears at the intersection of the outer circle and the vertical radial line 156a. This number corresponds to men's undershirt size 36. Along the same radial line, proceeding toward the center of dial 156 at the next intersection, number 24 corresponds to boy's undershirt size 24. Number 39 along the same radial line corresponds to men's brief waist size 39; number 31 corresponds to boy's brief waist size 31; number 23 corresponds to a men's brief leg opening dimension of 23 inches; 15 and 7 other leg opening dimensions men's and boy's briefs respectively. For convenience, the concentric lines may be color coded, orange, blue, green, etc. The length of chain 163 with weight 175 intermediately positioned on beam 176 is such that this position of weight 175 and thus scribe 184 will conveniently fall in an intermediate range of the chart 185.

The testing device of the embodiment illustrated in FIGS. 9–20 is operated for example on T-shirts by first connecting a suitable set of the shell members 126, 127 (for example, these corresponding to men's undershirts) to the cross members 138, 139 by engaging the tongues 147, 148 into the grooves 143, 144 (see FIG. 11). Next the weight 175 is moved out along beam 176 to a position where pin 178 can slip into hold 176a in beam 176. Spring 178b (see FIG. 15) loads pin 178 toward beam 176. When the weight has thus been positioned along the beam, chain clamp 174 is released and chain 163 is moved to rotate dial 156 until the appropriate radial line 156a containing the size or dimension of the garment being tested is in the vertical position with respect to line 159 on member 158. As mentioned, each radial line contains several different sizes or dimensions at concentric/radial line intersections and a range of these sizes or dimensions correspond to a set of members 126, 127 which are interchangeably positioned on cross members 138, 139 as needed. For example, one set of members 126, 127 will be used for a range of sizes of men's undershirts; another set for boy's undershirts; another for men's briefs and so on. With dial 156 suitably indexed, chain 163 is made taut and chain clamp 174 is fastened to fix the lengthwise relationship in terms of size between the weight and the spacing of members 126, 127. Since it is expected that knit garments stretch to fit the torso of the wearer, in a relaxed position, such garments will be much smaller than the "wear" size. With dial 156 set to a given size and the length of chain 163 adjusted while the position of weight 175 is fixed vis a vis calibrating hole 176a in beam 176, the distending position of shell members 126, 127 corresponds to a mid-wear position (taking into account a range of body movements) for the size of garment being tested. Thus, during a test cycle, movement of the weight 175, as recorded on chart 185 by scriber 184, for some distance along the beam 176 before and for some distance after the calibrating position as determined by hole 176a, will represent a range of distending body movement for the size calibrated. It is the characteristic shape of the curve so recorded that will reveal the performance of the garment in the "wear range" for the size tested.

Figure 15:
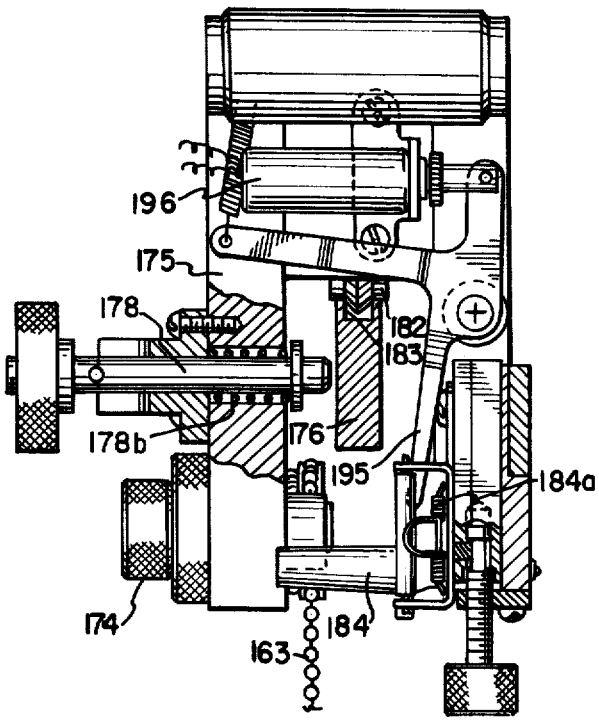
FIG. 15 is a somewhat idealized sectional elevational view taken along line 15—15 of FIG. 13 and showing details of mechanisms whereby the scribe is spaced from or brought into contact with the chart.

During testing, the cable 188 is payed out causing the beam 176 to incline downwardly about the pivot 78 so that the weight 175 rides down the beam 176 pulling the chain 163 to rotate the front sheave 154 and in turn the pinion 152 thereby moving the cross members 138, 139 outwardly to spread the convex shell members 126, 127 simulating stressing of a wearer's torso in breathing or other body expanding activities. During a first cycle the scriber 184 is held away from the chart 185 by a spring biased lever 195 turned by extension of a solenoid 196 (FIG. 15). As best seen in FIG. 13, the beam 176 travels down in the slotted guide 179 until it contacts a microswitch 197 which signals reversal of direction of the motor 192 winch in cable 188 to return the beam 176 up the slotted guide 179 with assistance from the counterweight 164 (shown in FIG. 11). When the beam contacts microswitch 198 at the end of its upward travel, motor 192 is deenergized. When button 193c is depressed, the solenoid 196 is actuated and rotates the lever 195 out of engagement with the scriber 184. Scriber spring 184a then urges the scriber 184 into engagement with chart 185. When button 193b is depressed, the beam 176 may move downward with the scriber 184 in contact with chart 185. During this second cycle the scriber 184 traces movement of the weight 175 on the chart 185 to measure distention of the T-shirt 122 under the force imposed on the T-shirt 122 by virtue of the movement of the weight 175 along the beam 176.

Figure 18:
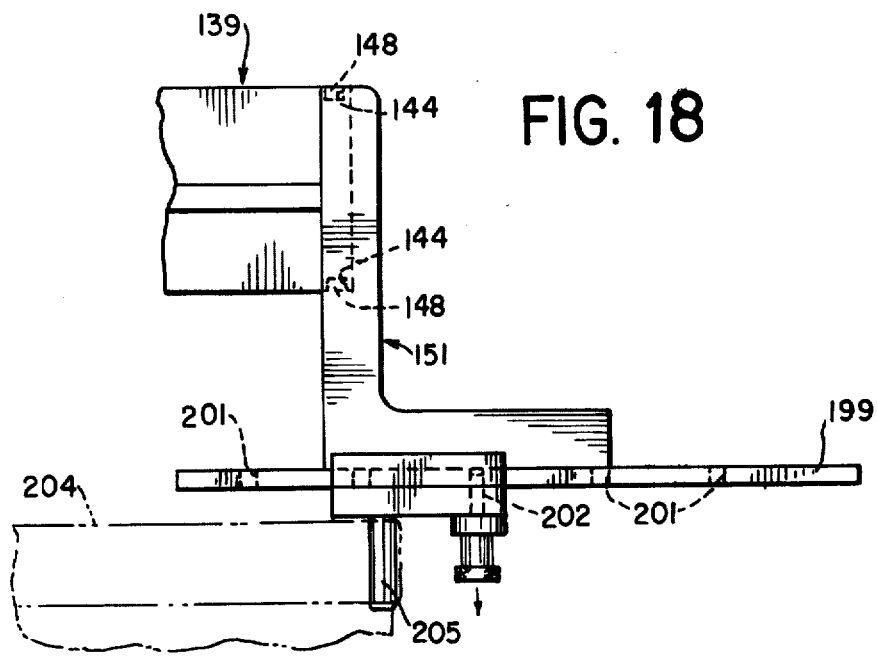
FIG. 18 is a broken planar view of one of the alternate fabric distending members shown in FIG. 17 and depicting a bracket mounted in tongue in groove relationship on the moving means.
Figure 19:
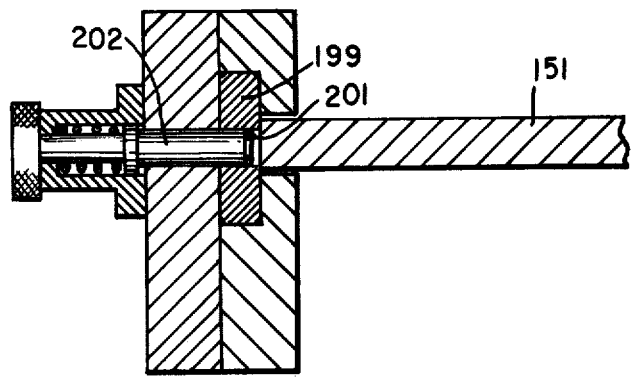
FIG. 19 is a sectional elevational view taken along line 19—19 of FIG. 17.

As seen best in FIGS. 17, 18 and 19, brief carrying members 149, 151 can be substituted for the shell members 126, 127. The brief carrying member 151 has a tongue 148 which mates with a groove 144 of the cross member 139 as best shown in FIG. 18 (also see FIG. 11). The brief carrying members 149, 151 include spacer bars 199 having holes 201 into which detents 202 fit for positioning the briefs 203. The waist band 204 of the briefs can be tested on pegs 205 or the briefs 203 can be tested laterally using downwardly spreading arms 206. A standardized load 207 generally is positioned in the crotch 208 of a pair of the briefs 203 during lateral testing as shown in FIG. 17.

All sizes of briefs, e.g. boys' through men's, or girls' through women's may be tested by members 149 and 151. For this purpose color coded indicia 220 located on spacer bars 199 is related to color coded indicia 221 on dial 156.

In order to assure a smooth transfer of forces between the weight 75 as it rides along the beam 76 and the distending members 26, 27, so as to assure that scribe 84 will create a smooth curve, in accordance with a further feature of the present invention, there has been provided a vibrator 110 which slidably engages the chain 63. Vibrator 110 is connected to the housing 68 by a leaf spring element 111. Pully 69 around which chain 63 passes is mounted to vibrator 110 by the shaft 69a. The vibrator is conventionally internally caused to pulsate by electromagnetic forces acting upon a movable metallic element, such that energization of the vibrator 110 will cause it to oscillate upon its spring support and such movement will be transmitted to chain 63, to the rack and ball slide bearing members which are connected to the fabric distending members to overcome the tendency of these parts to move intermittently because of inherent friction, and to cause the scribe to produce a smooth curve as a record of these distending forces.

It will be apparent to those familiar with testing of fabrics that wide deviations may be made from the foregoing embodiments without departing from a main theme of invention set forth in the claims.

I claim:

1. Apparatus for testing and recording distention characteristics of a stretchable fabric article under a simulated body movement stress, the apparatuus comprising in combination:
    a fabric carrying means arranged for movement to distend the fabric article,
    a force applying means for applying a controlled variable increasing force to move the fabric carrying means,
    a recording means for recording a measure of the fabric article's distention in relation to the controlled variably increasing force.

2. The apparatus of claim 1 with the force applying means including
    a beam arranged for constant controlled movement about a pivot from a horizontal position toward a generally vertical position, and
    a weight connected operatively to the fabric carrying means freely slidable on said beam.

3. The apparatus of claim 2 with
    the recording means comprising a scribe fixed to the weight,
    a chart mounted for engagement by the scribe to indicate distention characteristics of the fabric article as the pivot means causes the movement of the weight.

4. The apparatus of claim 3 with means for vibrating the scribe.

5. The apparatus of claim 4 with means for first distending the fabric article without the scribe in contact with the chart and then distending the fabric article with the scribe in contact with the chart.

6. The apparatus of claim 2 with
    the fabric carrying means comprising a pair of fabric carrying members,
    the weight connected operatively to the fabric carrying members,
    the recording means recording a measure of distance separating the fabric carrying members.

7. The apparatus of claim 6 with
    the fabric carrying members comprising a pair of plates,
    each of the plates having a convex side,
    the fabric article a garment with a torso portion,
    the plates being disposed with their convex sides outward for receiving thereover the torso portion whereby the convex sides cause the torso portion to distend as the plates are separated.

8. The apparatus of claim 7 for testing and recording distention characteristics of a T-shirt under a simulated body movement stress, with
    the frame provided with a yoke shaped shoulder form to support the T-shirt,
    the plates being disposed to receive thereover a torso portion of the T-shirt.

9. The apparatus of claim 8 with a plurality of sets of the plates and each of the sets a different size.

10. The apparatus of claim 6 with
    a frame,
    the fabric carrying members connected operatively to the frame.

11. The apparatus of claim 10 with
    moving means connected operatively between the fabric carrying members and the weight for moving the fabric carrying members,
    the moving means comprising a pair of racks disposed in face to face relationship and each connected respectively to one of the pair of fabric carrying members,
    a pinion mounted rotatably on the frame to engage drivingly both of the racks.

12. The apparatus of claim 11 with
    a cable windable about the pinion,
    the cable attached to the weight.

13. The apparatus of claim 6 with the fabric carrying members provided with means for engaging girthwise a waist encircling band of a pair of briefs.

14. The apparatus of claim 6 with the fabric carrying members provided with means for engaging outwardly lateral portions of a pair of briefs.

15. The apparatus of claim 14 with a weight positionable in the crotch of the pair of briefs.

16. A method for testing and recording distention characteristics of a stretchable fabric article under a simulated body movement stress, the method comprising steps of:
    providing fabric carrying means arranged for movement to distend the fabric article,
    applying a controlled variably increasing force to move the fabric carrying means,
    recording a measure of the fabric article's distention in relation to the variable force.

17. The method of claim 16 and
    providing the variable force by means of a weight connected operatively to the fabric carrying means,
    providing a beam arranged for movement of the weight thereon,
    pivoting the beam to cause movement of the weight under gravity from a generally horizontal position toward a vertical position.

18. The method of claim 17 and
    providing fabric carrying members as the fabric carrying means,
    recording a measure of distance separating the fabric carrying members as the measure of the fabric article's distention.

19. An apparatus for testing and recording distention characteristics of stretchable fabrics under a simulated body movement stress, the apparatus comprising in combination: a rigid frame, a pair of fabric carrying members mounted on said frame for movement to distend a fabric article carried thereby, moving means mounted on said frame for separating said fabric carrying members in response to a force applied thereto and including a pair of racks disposed in face to face relationship and fixed respectively to said pair of fabric carrying members as well as a pinion mounted rotatably on said frame to engage drivingly both said racks, means for applying a variable force to said moving means, and recording means coupled to said means for applying a variable force for recording the distance separating said fabric carrying members in relation to application of said variable force.

20. The apparatus as set forth in claim 19 in which said means for applying a variable force to said moving means comprises a weight, a cable wound about said pinion and attached to said weight, a beam pivotally connected to said frame and supporting said weight for movement along said beam, and means for pivoting said beam to permit movement of said weight therealong under gravity.

21. The apparatus as set forth in claim 20 in which said recording means comprises a scribe fixed to said weight, and a chart mounted on said frame for engagement by said scribe to indicate distention characteristics of the fabric article as said beam is pivoted to allow movement of said weight.

22. The apparatus as set forth in claim 21 for testing and recording distention characteristics of a stretchable T-shirt, the frame provided with a yoke shaped shoulder form to support the T-shirt, the fabric carrying members provided with convex outer surfces to simulate torso action of a wearer.

23. An apparatus for testing and recording distention characteristics of stretchable fabrics under a simulated body movement stress, the apparatus comprising in combination: a rigid frame having a pair of fabric carrying members movably mounted thereon for movement to distend a fabric article, a weight mounted for movement with respect to said frame, means mounted on said frame and having said weight connected thereto for separating said fabric carrying members in response to movement of said weight and including a pair of racks disposed in face to face relationship and fixed respectively to said pair of fabric carrying members as well as a pinion mounted rotatably on said frame to engage drivingly both said racks and a cable wound about said pinion and connected to said weight, means for controlling movement of said weight, and recording means coupled to said weight for recording the distance separating said fabric carrying members in relation to the path of movement of said weight.

24. The apparatus as set forth in claim 23 in which said means for controlling movement of said weight comprises a beam connected pivotally to said frame and supporting said weight for movement along said beam, and means for pivoting said beam to permit movement of said weight therealong under gravity.

25. The apparatus as set forth in claim 24 in which said recording means comprises a scribe fixed to said weight, and a chart mounted on said frame for engagement by said scribe to indicate distention characteristics of the fabric article as said beam is pivoted to allow movement of said weight.

26. The apparatus as set forth in claim 25 for testing and recording distention characteristics of a stretchable T-shirt, the frame provided with a yoke shaped shoulder form to support the T-shirt, the fabric carrying members provided with convex outer surfaces to simulate torso action of a wearer.

27. Apparatus for testing and indicating distention characteristics of a stretchable fabric article under a simulated body movement stress, the apparatus comprising in combination:
- a fabric carrying means arranged for movement to distend the fabric article,
- a force applying means for applying a controlled variably increasing force to move the fabric carrying means,
- an indicating means for indicating a measure of the fabric article's distention in relation to the controlled variably increasing force.

28. The apparatus of claim 27 with the force applying means including
- a beam arranged for constant controlled movement about a pivot from a horizontal position toward a generally vertical position, and
- a weight connected operatively to the fabric carrying means freely slidable on said beam.

29. The apparatus of claim 28 with
- the fabric carrying means comprising a pair of fabric carrying members,
- the weight connected operatively to the fabric carrying members,
- the indicating means indicating a measure of distance separating the fabric carrying members.

30. The apparatus of claim 29 with
- the fabric carrying members comprising a pair of plates,
- each of the plates having a convex side,
- the fabric article a garment with a torso portion,
- the plates being disposed with their convex sides outward for receiving thereover the torso portion whereby the convex sides cause the torso portion to distend as the plates are separated.

31. The apparatus of claim 29 with
- a frame,
- the fabric carrying members connected operatively to the frame.

32. The apparatus of claim 31 with
- moving means connected operatively between the fabric carrying members and the weight for moving the fabric carrying members,
- the moving means comprising a pair of racks disposed in face to face relationship and each connected respectively to one of the pair of fabric carrying members,
- a pinion mounted rotatably on the frame to engage drivingly both of the racks.

33. Apparatus for testing and recording distention characteristics of a stretchable fabric article under a simulated body movement stress, the apparatus comprising in combination:
- a fabric carrying means arranged for movement to distend the fabric article,
- a force applying means for applying a variable force to move the fabric carrying means,
- a weight connected operatively to the fabrice carrying means,
- a beam arranged for movement of the weight thereon,
- pivot means for pivoting the beam to cause movement of the weight under gravity,
- a scribe carried by said weight,
- a chart for recording movements of said scribe upon movement of said weight, means operatively interconnecting said fabric carrying means and said weight, and vibrator means connected to said interconnecting means to free said interconnecting means from frictional binding forces, whereby said scribe will smoothly record movement of said weight upon said beam.

34. Apparatus accordingly to claim 33 which includes:

a frame, a spring attached to said frame, means for attaching said vibrator means to said spring, said interconnecting means includes a chain between said fabric carrying means and said weight, and said vibrator means is connected to said chain.

35. Apparatus for testing and recording distention characteristics of a stretchable fabric article under a simulated body movement stress, the apparatus comprising in combination:

a fabric carrying means arranged for movement to distend the fabric article a force applying means for applying a variable force to move the fabric carrying means, a recording means for recording a measure of the fabric articles distention in relation to the variable force, a beam arranged for movement of the weight thereon, pivot means for pivoting the beam to cause movement of the weight under gravity, a scribe fixed to said weight, and a chart mounted for engagement by the scribe to indicate distention characteristics of the fabric article as the pivot means causes movement of the weight.

* * * * *